Feb. 8, 1966 ZENMON ABE ETAL 3,234,473

DETECTION SYSTEMS FOR AMPLITUDE-MODULATED WAVES AND COMMUNICATION SYSTEMS UTILIZING SAID DETECTION SYSTEMS

Filed March 15, 1963 3 Sheets-Sheet 1

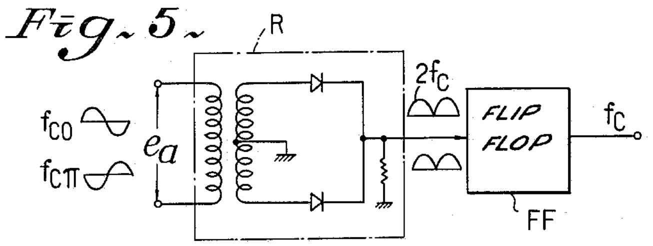
Fig. 6
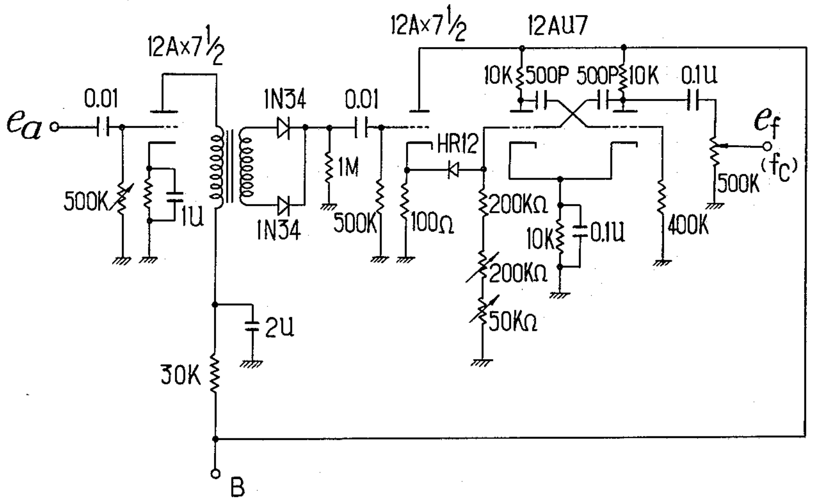
Fig. 7
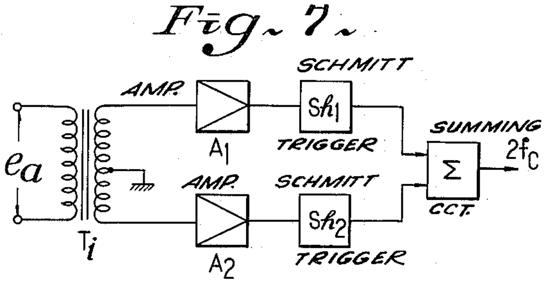

Feb. 8, 1966 ZENMON ABE ETAL 3,234,473

DETECTION SYSTEMS FOR AMPLITUDE-MODULATED WAVES AND COMMUNICATION SYSTEMS UTILIZING SAID DETECTION SYSTEMS

Filed March 15, 1963 3 Sheets-Sheet 3

United States Patent Office 3,234,473
Patented Feb. 8, 1966

3,234,473

DETECTION SYSTEMS FOR AMPLITUDE-MODULATED WAVES AND COMMUNICATION SYSTEMS UTILIZING SAID DETECTION SYSTEMS

Zenmon Abe, Kitatama-gun, Tokyo-to, Ryutaro Mori, Kodaira-shi, Sadao Yoshimaru, Kitatama-gun, Tokyo-to, Toshio Numakura, Kodaira-shi, and Takaji Suzuki, Kitatama-gun, Tokyo-to, Japan, assignors to Kabushiki Kaisha Hitachi Seisakusho, Tokyo-to, Japan, a joint-stock company of Japan Filed Mar. 15, 1963, Ser. No. 265,526
Claims priority, application Japan, Mar. 19, 1962, 37/9,992; Aug. 4, 1962, 37/33,500
1 Claim. (Cl. 329—50)

This invention relates to a detection system responsive to amplitude-modulated signals (AM signals) of voice and other communication interest. At present, amplitude-modulation systems have wide application for various signal-transmission purposes, but a satisfactory detection system has not yet been developed which is characterized by small distortion where the degree of modulation of the carrier is high. Analysis of amplitude-modulation systems shows that the amplitude-modulated signal $e_a$ is generally defined by $$e_a = E_a[1+m \cos(\omega_s t+\phi)] \cos \omega_c t \qquad (1)$$

where $E_a \cos \omega_c t$ represents the equation of the carrier wave,
$m$ is the degree of modulation,
$\omega_s$ is the angular frequency of the signal,
$\phi$ is the phase angle, and
$t$ is the time:

From Equation 1, if it is assumed that the load is a resistive impedance, that the ratio between the sideband power and the carrier power is represented by $\tau_c$, and that the ratio between the total power and the sideband power is $\tau_t$, the following relations would be obtained;

$$\tau_c = m^2/2 \qquad (2)$$

$$\tau_t = \tau_c/(1+\tau_c) \qquad (3)$$

In conventional communication systems, values of $m \cong 0.4 \sim 0.7$ are generally used since distortion of detection increases as the degree of modulation is increased. By computing the values of $\tau_t$ for these cases from the above equations, very small values i.e. of $\tau_t$ are obtained which are far from the ideal condition of $\tau_t=1$. On the other hand, in D.C. amplifiers and the like, of the modulation type, a detector system is utilized wherein low-frequency input signals are subjected to amplitude modulation by using a D.C.–A.C. converter (modulator) and thereafter detected synchronously. The degree of modulation in the case of a D.C.–A.C. converter is generally larger than unity (i.e. over-modulation) but this system is advantageous in that it is able to provide a detector output of extremely small distortion by means of the synchronous detection system. By utilizing such a synchronous detection system as a detector in the receiving device of a conventional signal-transmission system, detected outputs of very low distortion can be provided on the receiver side even when, as indicated above, a degree of modulation larger than unity is employed on the sending side. Thus, one can expect that the synchronous system can greatly increase the efficiency of transmitting power as based upon the equations given above. Yet there remains the problem of providing means on the receiving side capable of producing a voltage which is synchronized with the modulated signal or a signal to drive the synchronized detector. While the synchronizing voltage for driving said synchronous detector can be directly derived from the source of modulating-signal voltage for the modulator where the amplitude modulator (including also the D.C.–A.C. converter) and the synchronous detector are arranged in the same device (as in the case of said D.C. amplifier), it is difficult to obtain such a synchronizing-signal voltage by similar means in a signal-transmitting system in which the transmitter and receiver are separated and remote from one another. To solve this problem a method has been proposed heretofore whereby a stable oscillator having the same frequency as the modulating frequency is provided on the receiving side to drive the synchronous detector circuit by the output of said oscillator; this method, however, requires that the output frequency and phase of the stable oscillator should always coincide with those of the modulating signal on the transmitter side, a result which, in practice, is very difficult to achieve at low cost and with simple construction.

It is therefore the object of this invention to eliminate the above-mentioned difficulties and to permit the use of synchronous detecting systems even in general signal-transmission systems.

While the specification concludes with claims particularly pointing out and distinctly claiming the subject matter of this invention, it is believed that the invention will be best understood from the following description taken in connection with the accompanying drawing.

Figure 3A:
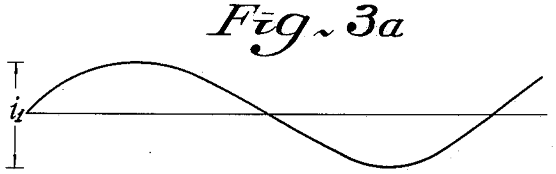
Figure 3B:
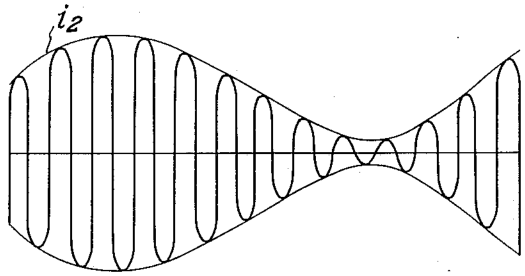
Figure 3C:
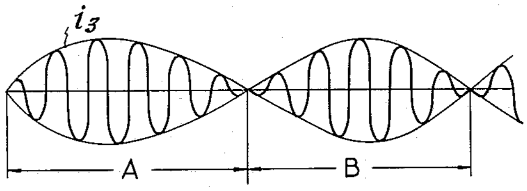
Figure 8:
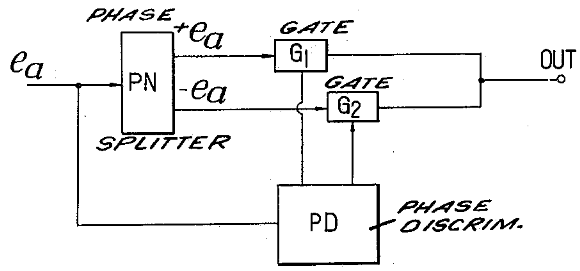
Figure 9:
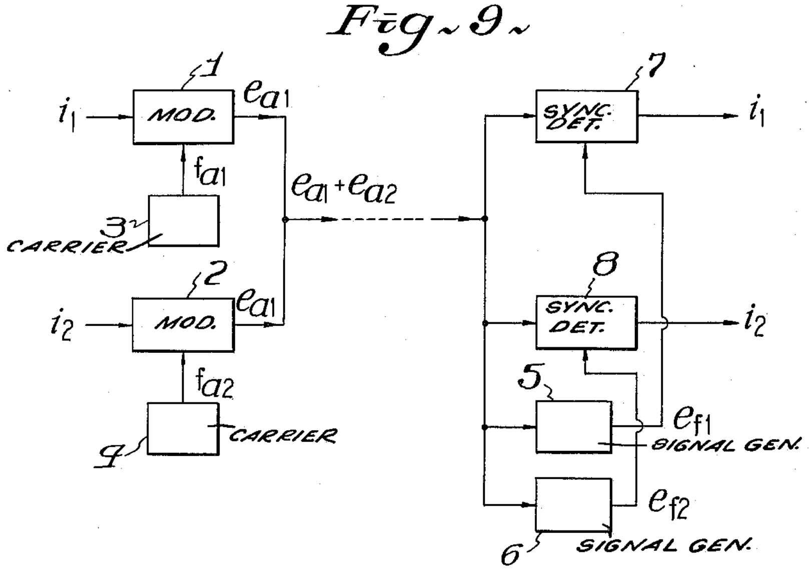

FIGS. 3*a*–3*c*, waveforms of amplitude-modulated waves to explain the operation of this invention;

FIGS. 4 to 8 inclusive are circuit diagrams, partly in block form, of several embodiments of this invention; and FIG. 9 is a block diagram of a duplex communication system embodying this invention.

Figure 1:
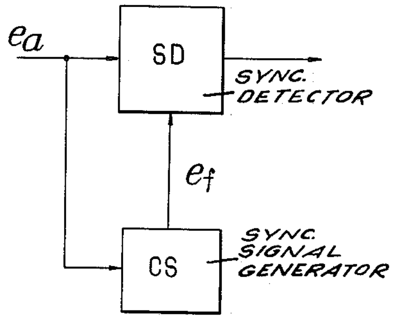
FIG. 1 is a block diagram of a circuit illustrating the principles of this invention.
Figure 2:
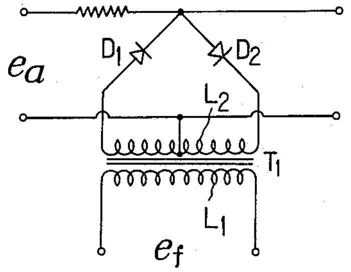
FIG. 2 is a circuit diagram of one example of a synchronous detector circuit suitable for use in the system of the instant invention.

In the accompanying drawing there is shown in FIG. 1 a basic arrangement of the detecting system of this invention wherein $e_a$ represents the above-mentioned amplitude-modulated signal, and CS a circuit for generating the synchronizing signal $e_f$ this circuit including means for properly adjusting the phase of the synchronizing signal. SD represents a synchronous detector which is driven by the synchronizing signal $e_f$ to detect the amplitude-modulated signal $e_a$ in synchronism with its modulating frequency. The synchronous detector circuit may be of the same kind as that generally utilized in chopper-type D.C. amplifiers and the like. FIG. 2 shows one example of such circuit wherein a pair of diodes $D_1$ and $D_2$ and the secondary winding $L_2$ of a transformer $T_1$ are connected in series in a closed loop, said amplitude-modulated signal $e_a$ being impressed on the closed loop across the junction between the pair of diodes and an intermediate tap of the secondary winding $L_2$. The diodes are switched to effect the synchronous detection by impressing across the primary winding $L_1$ of the transformer $T_1$ a voltage $e_f$ which is synchronized with the carrier wave of the amplitude-modulated signal.

It will be understood that the above-described synchronizing signal-generating circuit CS constitutes the essential part of this invention and functions to generate the synchronizing signal voltage $e_f$ of the same phase and having essentially the same frequency $f_c$ as the modulating frequency from the amplitude-modulated input signal $e_a$. In some applications of this invention, since the degree of modulation $m$ of the amplitude-modulated signal $e_a$ might be larger than unity, it is required that this circuit should always generate signals having the same frequency as the carrier-wave frequency of constant phase. More particularly, with an impressed signal $i$, as shown in FIG. 3$a$, the amplitude-modulated signal will take a wave form as shown in FIG. 3$b$ which is modulated at substantially less than 100% modulation since, in conventional communication applications, reception with low distortion is desired. Accordingly in this case it is possible to obtain the required synchronizing signals by selectively deriving the carrier wave alone, but in accordance with this invention it is intended to provide amplitude-modulated signals which are over-modulated ($m>1$) as shown in FIG. 3$c$. In such a case, inasmuch as the magnitude of the modulated-wave component contained in the modulated wave is small it is extremely difficult to selectively derive this component. Such an over-modulated signal is characterized by the fact that the phase of the received waves would be reversed in response to the polarity reversal of the input signal $i$. Thus, as can be noted from FIG. 3$c$, the phase of the received waves reverses between portions A and B. It will be obvious that when only the received wave is utilized as the synchronizing signal it is possible to provide a detected output signal of one polarity alone, i.e. either positive or negative, where $m>1$. The above-described synchronizing-signal-generating circuit CS, however, is a circuit capable of providing the same phase with $m<1$ and thus is irrespective whether or not $m>1$, the phase of the received wave is reversed as is true with $m>1$. (This is what is referred to as the function of equalizing the phases.)

A practical construction of a synchronizing-signal-generating circuit which can equalize the phases will now be described.

Figure 4:
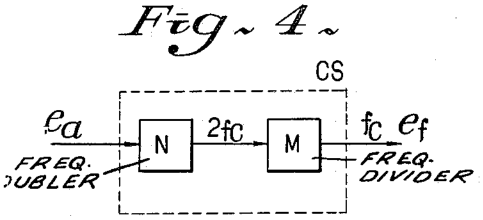

The synchronizing-signal-generating circuit shown in FIG. 4 comprises a frequency multiplier N adapted to convert the frequency $f_c$ of the carrier-wave component of the input amplitude-modulated signal $e_a$ into a frequency of $nf_c$ of $n$ times its original value and a frequency divider M adapted to reduce the frequency of this output to $1/n$. Assume now the case in which $n=2$, when a well-known full-wave rectifier is used as the frequency doubler N, as shown in FIG. 5, by impressing upon the input of said full-wave rectifier a carrier wave $f_{co}$ whose degree of modulation $m<1$ or a carrier wave $f_{c\tau}$ where $m>1$; a signal of constant phase having the fundamental frequency of $2f_c$ will be produced at the output of the frequency multiplier. Thus when this output is reduced by ½ by means of a flip-flop frequency-dividing circuit FF (FIG. 5), after amplification, if necessary, it is obvious that a synchronizing-signal voltage of constant phase and having the same frequency as the carrier-wave frequency $f_c$ can be obtained across its output. This is equivalent to impressing the signal $e_a$ across a nonlinear element to deive an appropriate harmonic, such as for instance $nf_c$, and then reducing its frequency to one $n$th of its value. It is to be noted that it is usually most effective and results in high efficiency if $n=2$ as in this case. The practical circuit of the construction of FIG. 5 is shown in FIG. 6. The result of tests made on this circuit showed that a stable synchronous detector output could be obtained. A circuit including an input transformer $T_1$, amplifiers $A_1$ and $A_2$, Schmitt-trigger circuits $sh_1$ and $sh_2$ and a summing circuit Σ as shown in FIG. 7 may be substituted for the full-wave rectifier producing $2f_c$ in order to similarly produce an output $2f_c$ of constant phase. In these embodiments it is possible first to reduce the frequency of the carrier wave to ½ by means of a frequency divider and then to increase the resultant frequency $n$ times by utilizing a frequency multiplier in order to produce the required synchronizing signal voltage.

FIG. 8 shows still another embodiment of this invention comprising a phase-splitter circuit PN serving to convert an amplitude-modulated signal $e_a$ into a signal $+e_a$ of the same phase and a second signal $-e_a$ having the opposite phase, a detector circuit or phase discriminator PD to detect the phase of the carrier wave for the incoming signal $e_a$ and a pair of gate circuits $G_1$ and $G_2$ controlled by the output from the detector circuit. This circuit operates in such a way that when the degree of modulation of the amplitude-modulated signal $e_a$ is smaller than unity, phase discriminator PD determines the existence of a predetermined phase and closes the gate $G_2$ so that the oscillation $+e_a$ will appear across the output terminals OUT as an unchanged replica of the received wave. As the phase of the carrier wave is inverted when $m>1$, this condition is detected by the phase discriminator PD and results in closure of the gate circuit $G_1$ whereby there will appear across the output terminals OUT the oscillation $-e_a$ representing the amplitude-modulated wave $e_a$ with inverted phase. As a result a carrier wave having the same constant phase as in the case of $m<1$ is produced across the output terminals which can be utilized as the synchronizing-signal voltage $e_f$, after amplification if required.

The phase detector PD in the above embodiment may comprise, for instance, a phase shifter which serves to shift the phase of the carrier wave, Schmitt-trigger circuits respectively included in the output of each of the phase-shifting circuits, and an AND gate circuit to obtain the output corresponding to the logical product of the outputs of each Schmitt-trigger circuit whereby to control the switching operation of gate circuits $G_1$ and $G_2$.

It will be understood to those skilled in the art that a phase-compensating circuit may be provided for compensating lag or lead in the phase in the synchronizing-signal-generating circuit CS or in the synchronous detector SD of the above-described embodiments.

With the synchronous detecting system thus far described, the output of the detector is an amplified component as in the case of the well-known homodyne detector. Therefore, where voices are the signals to be transmitted by way of a low-pass filter with a cut-off frequency of 10 kc., it is easy to provide a circuit having cut-off characteristics superior to those resulting in the case where the signal is filtered at a higher frequency as in a heterodyne system. If the generated synchronous-signal voltage is superimposed upon the input amplitude-modulating wave (for example, an over-modulated wave) to effect usual homodyne detection (where $m<1$) and the combined wave is impressed across a non-linear element, it is possible to effect homodyne detection of the over-modulated wave with small distortion, which is very advantageous in practical applications. Also when the phase of the switching operation of the synchronous detector (i.e. the phase of the synchronizing signal) is displaced by 90° with respect to the input modulating wave, the detector output will be very small (in the ideal condition, zero) so that duplex communication becomes possible by utilizing this principle.

FIG. 9 illustrates this duplex communication system in block form with $i_1$ and $i_2$ representing input signals, circuits 1 and 2 modulators for said input signals, respectively, and 3 and 4 carrier-wave signal generators for said modulators. Each of said carrier-wave signal generators 3 and 4 generates signals $f_{a1}$ and $f_{a2}$, respectively, of the same frequency $f$ but differing in phase by 90° to apply these signals, respectively, to the modulators 1, 2 which yield two amplitude modulated waves $e_{a1}$ and $e_{a2}$ having the same frequency as the carrier wave but differing in phase by 90°. These amplitude-modulated waves $e_{a1}$ and $e_{a2}$ are combined and then transmitted to the receiving side. Synchronous signal generators 5 and 6 on the receiving side function to derive signals $e_{f1}$ and $e_{f2}$, synchronized with the respective carrier waves $f_{a1}$ and $f_{a2}$, from the combined amplitude-modulated waves $e_{a1}+e_{a2}$. The synchronous signal generators may be of the same construction as those shown in FIGS. 5 or 7. Synchronous detector circuits 7 and 8 are respectively excited by the synchronous signals $e_{f1}$ and $e_{f2}$ to provide output signals reproduced from the input signals $i_1$ and $i_2$. Such a duplex communication system may be used in stereo broadcasting to provide simple communication of high fidelity. In addition, when the combined modulated waves are recorded by a tape recorder and then reproduced, stereo recording and reproduction are possible. Thus the detecting system according to this invention is advantageous in that it permits adaptation of the synchronous detection system to the usual signal-transmitting systems, and permits a decrease in transmitting power as well as distortions in the detected wave, thus fully utilizing characteristic features of the synchronous detecting system. Moreover, selectivity of filters can be improved. For example, when this invention is utilized in conventional broadcasting communications, the transmitting power may be decreased to a small fraction of that currently required.

It will be clear to those skilled in the art that this invention is not limited to the conventional broadcasting communications but may equally be applied to various signal-transmitting systems for use in telemetering devices for signals produced by industrial measuring instruments, telemetering device for electric signals of physiological parameters and devices utilizing recording and reproducing devices of the magnetic-tape type and the like.

While the invention has been explained by describing particular embodiments thereof, it will be apparent that improvements and modifications may be made without departing from the true spirit and scope of the invention as defined in the appended claim.

What is claimed is:

A detecting system for an amplitude-modulated carrier wave, comprising:

input means;

a receiving circuit for an incoming modulated carrier wave connected to said input means, said circuit including phase-splitting means having two outputs for the reproduction of said wave as two oscillations of mutually opposite phase and equal amplitude;

first gate means connected in series with one of said outputs;

second gate means connected in series with the other of said outputs;

an output circuit common to both said first and second gate means;

and phase-discriminator means having an input connection to said input means and output connections to said first and second gate means for blocking said first gate means in response to a predetermined phase of said incoming wave and for blocking said second gate means in response to an opposite phase of said incoming wave whereby a resultant oscillation of constant phase is transmitted to said output circuit in the presence of phase reversal of said incoming wave.

References Cited by the Examiner

UNITED STATES PATENTS

| | | | |
|---|---|---|---|
| 1,608,566 | 11/1926 | Potter. | |
| 2,352,634 | 7/1944 | Hull. | |
| 2,467,486 | 4/1949 | Krumhansl et al. | 329—50 |
| 2,857,457 | 10/1958 | Richman | 178—5.4 |
| 2,885,467 | 5/1959 | Schlesinger | 329—50 |
| 2,960,562 | 11/1960 | Macovski | 328—133 X |
| 2,979,562 | 4/1961 | Leyton | 178—5.4 |
| 2,979,611 | 4/1961 | Halina | 329—50 X |
| 2,991,354 | 7/1961 | Crafts | 328—133 X |
| 3,070,662 | 12/1962 | Eilers | 325—36 X |
| 3,084,011 | 4/1963 | Palic. | |
| 3,094,666 | 6/1963 | Smith | 328—133 X |

DAVID G. REDINBAUGH, *Primary Examiner.*

BERNARD KONICK, JOHN W. CALDWELL, MARVIN S. GITTES, *Assistant Examiners.*